US012256867B1

(12) United States Patent
Quisumbing

(10) Patent No.: US 12,256,867 B1
(45) Date of Patent: Mar. 25, 2025

(54) COCKTAIL SHAKER WITH MOVABLE COVER

(71) Applicant: David Quisumbing, Wall, NJ (US)

(72) Inventor: David Quisumbing, Wall, NJ (US)

(73) Assignee: Speed Tin LLC, Wall, NJ (US)

( * ) Notice: Subject to any disclaimer, the term of this patent is extended or adjusted under 35 U.S.C. 154(b) by 0 days.

(21) Appl. No.: 18/636,834

(22) Filed: Apr. 16, 2024

Related U.S. Application Data

(60) Provisional application No. 63/601,614, filed on Nov. 21, 2023.

(51) Int. Cl.
*A47J 43/27* (2006.01)
*B65D 47/28* (2006.01)
*A47G 19/22* (2006.01)

(52) U.S. Cl.
CPC ......... *A47J 43/27* (2013.01); *A47G 19/2272* (2013.01); *B65D 47/286* (2013.01); *B65D 2543/00046* (2013.01)

(58) Field of Classification Search
CPC ......... A47J 43/27; B65D 43/02; B65D 47/26; B65D 47/286; B65D 2543/00046; A47G 19/2272
USPC ..... 215/315, 322; 220/568, 348, 254.9, 714, 220/796, 715, 262; 222/511, 561, 559, 222/505, 544, 470, 487, 547; 366/130, 366/219; D7/300.1; D9/447
See application file for complete search history.

(56) References Cited

U.S. PATENT DOCUMENTS

| | | | | |
|---|---|---|---|---|
| 562,577 A * | 6/1896 | William | ............... | B65D 47/286 220/348 |
| 1,066,813 A * | 7/1913 | Andrew | ............... | B65D 47/265 222/511 |
| 1,311,273 A * | 7/1919 | Hackbirt | ............... | B65D 47/286 220/254.9 |
| 1,740,223 A | 12/1929 | Burvenick et al. | | |
| 1,877,153 A * | 9/1932 | Walter | ................. | B65D 47/265 222/511 |
| 1,963,050 A * | 6/1934 | Graham | ................. | B65D 47/30 222/545 |
| 1,980,049 A * | 11/1934 | Gainer | ................. | B65D 47/286 222/561 |
| 2,127,911 A * | 8/1938 | Horace | ................ | B65D 47/286 222/561 |
| 2,152,600 A * | 3/1939 | Morrison | ............. | B65D 47/286 222/545 |

(Continued)

*Primary Examiner* — Gideon R Weinerth
(74) *Attorney, Agent, or Firm* — Davidson Kappel LLC

(57) ABSTRACT

A cocktail shaker is provided that includes a cup for receiving liquid ingredients and a lid for installing on the cup. The lid includes a base including an opening for dispensing the liquid ingredients out of the cocktail shaker, and a pressure relief hole for releasing air from the cup while dispensing the liquid ingredients out of the cocktail shaker through the opening. The lid also includes a cover movably coupled to the base for moving between a first orientation in which the cover covers the opening and the pressure relief hole, and a second orientation in which the opening and the pressure relief hole are uncovered. The lid further includes at least one elastically biasing the cover into the first orientation. The cover is movable from the first orientation into the second orientation by overcoming the biasing by the at least one elastically.

20 Claims, 6 Drawing Sheets

(56) References Cited

U.S. PATENT DOCUMENTS

| | | | | |
|---|---|---|---|---|
| 2,327,618 | A * | 8/1943 | Bernhardt | A47G 19/12 222/511 |
| 2,433,142 | A * | 12/1947 | Moen | A45D 33/025 220/348 |
| 2,501,735 | A * | 3/1950 | Nyden | B65D 47/268 222/542 |
| 2,589,415 | A * | 3/1952 | Meshberg | A47J 43/27 222/548 |
| 2,752,971 | A * | 7/1956 | Tupper | A47J 43/27 215/11.1 |
| 2,884,157 | A * | 4/1959 | Lampkin | A47G 19/2272 220/348 |
| 3,118,577 | A * | 1/1964 | Estabrook | B65D 47/286 D9/449 |
| 3,341,089 | A * | 9/1967 | Pearsall | A47J 43/27 D7/300.1 |
| 3,447,724 | A * | 6/1969 | Fiddyment | B65D 47/286 222/561 |
| 3,792,803 | A * | 2/1974 | Kessler | B65D 47/286 220/348 |
| 3,938,690 | A * | 2/1976 | Butler | B65D 47/286 220/348 |
| 4,057,167 | A * | 11/1977 | Lee | B65D 47/286 220/348 |
| 4,673,813 | A * | 6/1987 | Sanchez | G21F 5/015 220/253 |
| 5,046,613 | A * | 9/1991 | Baudry | B65F 1/1607 220/348 |
| 5,199,597 | A * | 4/1993 | Gladish | A47G 19/2272 220/348 |
| 5,310,081 | A * | 5/1994 | McCabe | B65D 47/286 220/259.5 |
| 6,102,259 | A * | 8/2000 | Tsamourgelis | B65D 47/305 222/561 |
| 6,648,158 | B1 * | 11/2003 | Lawrence | B65D 55/16 220/348 |
| 6,752,287 | B1 * | 6/2004 | Lin | A47G 19/2272 220/254.9 |
| 6,763,964 | B1 * | 7/2004 | Hurlbut | A47G 19/2272 222/481.5 |
| 6,824,003 | B1 * | 11/2004 | Wong | B65D 43/0202 220/254.9 |
| 7,513,380 | B2 * | 4/2009 | Canedo | A45F 3/18 220/264 |
| 8,919,593 | B2 * | 12/2014 | Sinacori | B65D 47/286 220/264 |
| 9,161,663 | B1 | 10/2015 | LeBlanc et al. | |
| 10,906,710 | B2 * | 2/2021 | Isengingo | A47G 19/2266 |
| D960,667 | S | 8/2022 | Manchanda et al. | |
| 11,447,309 | B2 * | 9/2022 | Jinkins | A47G 19/2272 |
| 2005/0029265 | A1 * | 2/2005 | Morgan | A47G 19/2288 220/254.9 |
| 2006/0175330 | A1 * | 8/2006 | Richardson | B65D 51/2892 220/521 |
| 2007/0170184 | A1 * | 7/2007 | Canedo | A45F 3/18 220/230 |
| 2007/0278228 | A1 * | 12/2007 | Wong | B65D 47/286 220/780 |
| 2008/0190946 | A1 * | 8/2008 | Wong | B65D 47/286 220/711 |
| 2009/0057324 | A1 * | 3/2009 | Wang Wu | A47G 19/2272 220/711 |
| 2012/0012585 | A1 * | 1/2012 | Sinacori | B65D 47/286 220/254.9 |
| 2012/0080456 | A1 * | 4/2012 | Steininger | B65D 81/3869 222/531 |
| 2014/0065276 | A1 * | 3/2014 | Howard | A47J 43/27 99/275 |
| 2015/0250341 | A1 * | 9/2015 | Liu | B65D 47/32 220/254.1 |
| 2017/0121074 | A1 * | 5/2017 | Seiders | B65D 47/286 |
| 2018/0014671 | A1 * | 1/2018 | Karussi | B65D 43/12 |
| 2018/0265266 | A1 * | 9/2018 | McNamara | B65D 47/06 |
| 2020/0055645 | A1 * | 2/2020 | Lane | A47G 19/2272 |
| 2020/0231345 | A1 * | 7/2020 | Lane | B65D 47/248 |
| 2020/0361672 | A1 * | 11/2020 | Jinkins | A47G 19/2272 |
| 2022/0112011 | A1 * | 4/2022 | McNamara | B65D 51/18 |
| 2023/0248165 | A1 * | 8/2023 | Lin | A47G 19/2266 220/713 |
| 2024/0101319 | A1 * | 3/2024 | Jinkins | B65D 47/32 |

* cited by examiner

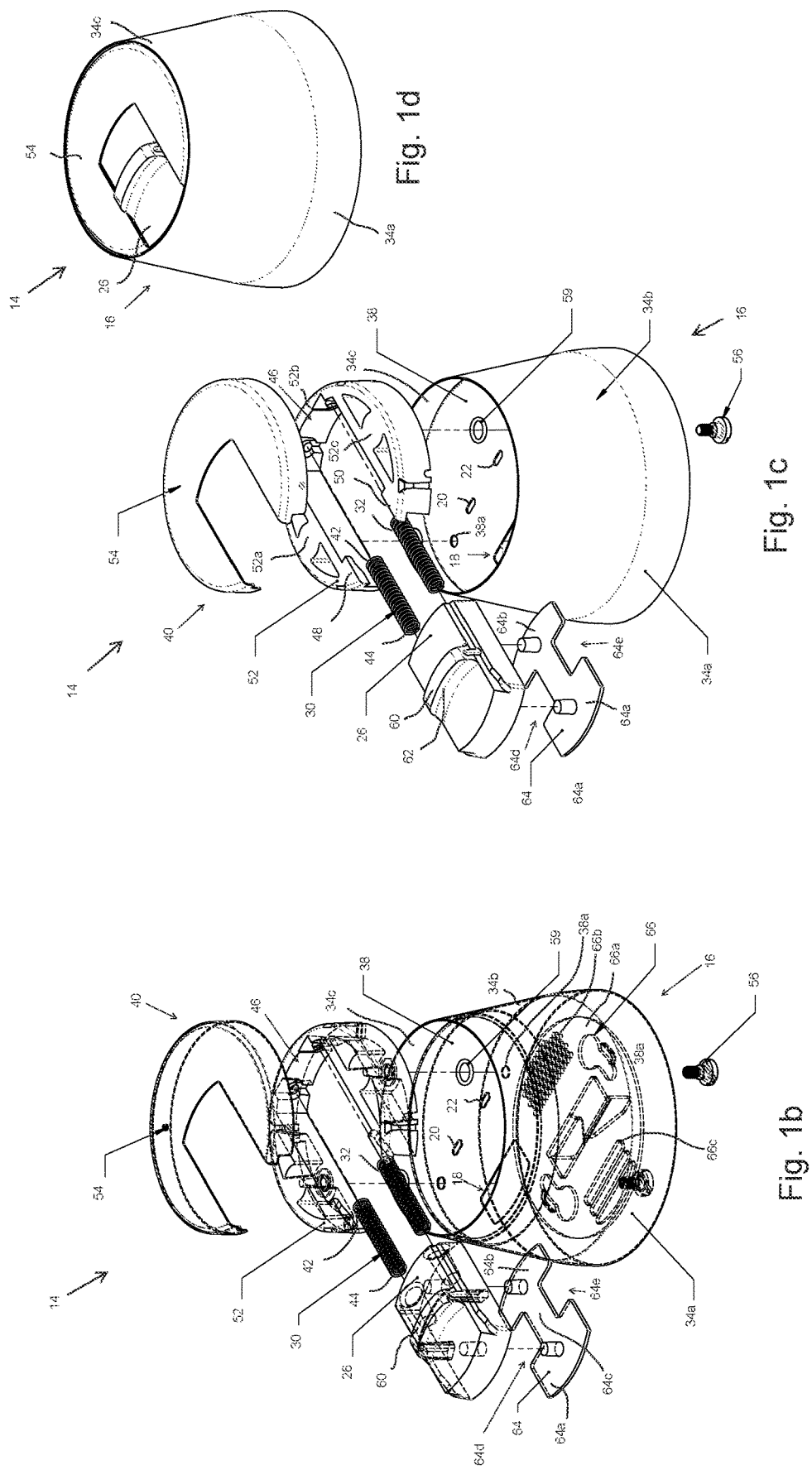

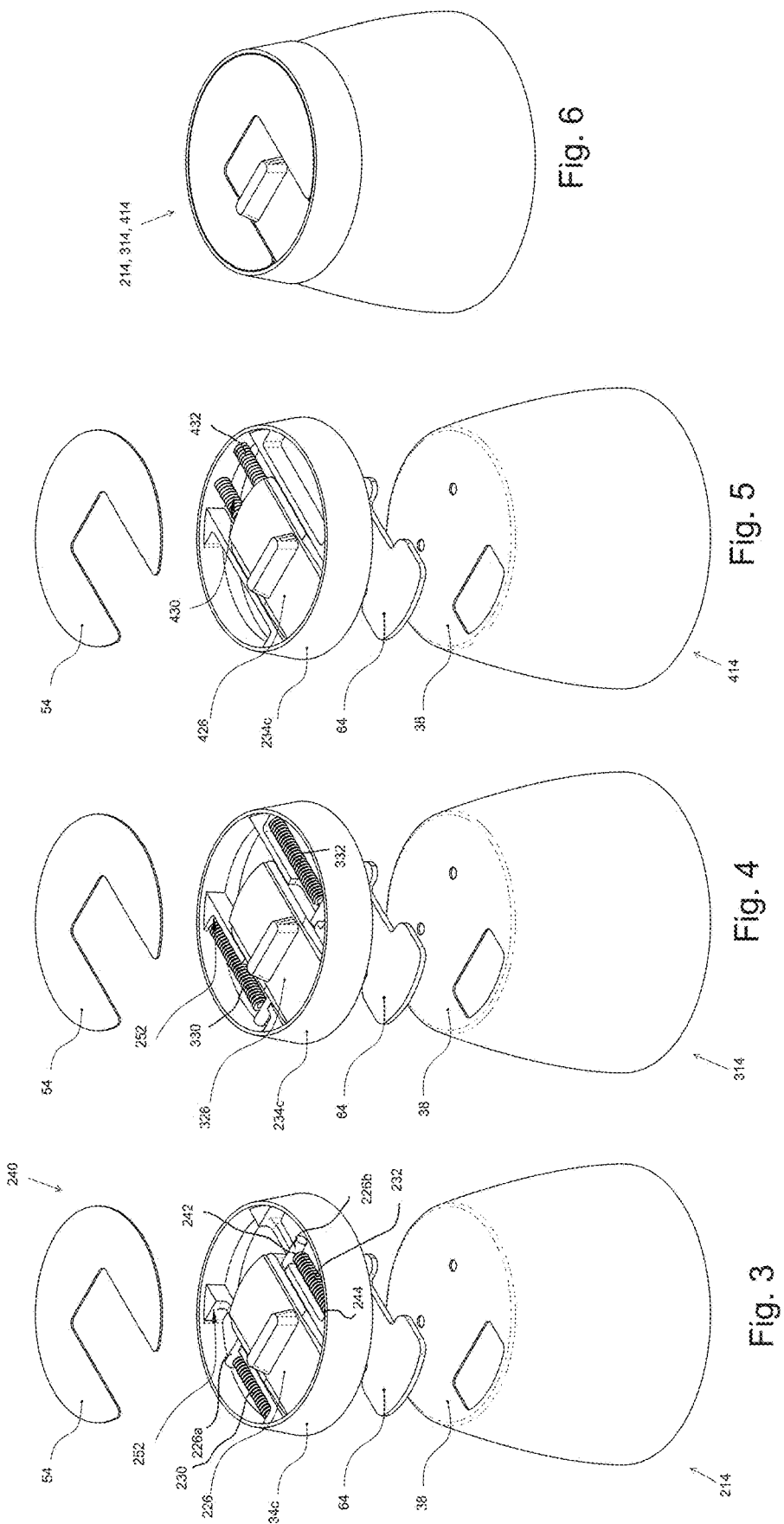

COCKTAIL SHAKER WITH MOVABLE COVER

BACKGROUND

Conventional cocktails shakers include lids that include two separate pieces. A first larger piece is a cup-shaped and attaches to the base cup of the cocktail shaker. The first larger piece includes pour-holes for pouring cocktails into glasses. A second smaller piece is cup-shaped cover and is removably attachable to the top of the first larger piece to prevent the cocktail from spilling out of the pour-holes when the cocktail is being shaken by a bartender, but is removable to pour cocktails out of the pour-holes into glasses. This arrangement requires the bartender to use both hands to remove the second smaller piece before pouring a cocktail, and can result in the second smaller piece getting misplaced.

SUMMARY

A cocktail shaker is provided that includes a cup for receiving liquid ingredients and a lid for installing on the cup. The lid includes a base including an opening for dispensing the liquid ingredients out of the cocktail shaker, and a pressure relief hole for releasing air from the cup while dispensing the liquid ingredients out of the cocktail shaker through the opening. The lid also includes a cover movably coupled to the base for moving between a first orientation in which the cover covers the opening and the pressure relief hole, and a second orientation in which the opening and the pressure relief hole are uncovered. The lid further includes at least one elastic element biasing the cover into the first orientation. The cover is movable from the first orientation into the second orientation by overcoming the biasing by the at least one elastic element.

In examples, the base includes: an annular section for coupling to a top edge of the cup; and a top wall including the opening and the pressure relief hole, the cover being slidably connected to the top wall.

In examples, the base further includes a retainer configured for connecting the cover to the top wall.

In examples, a first portion of the at least one elastic element is connected to the retainer and a second portion of the at least one elastic element is connected to the cover.

In examples, the at least one elastic element configured for being in an expanded orientation in the first orientation of the cover and in a contracted orientation in the second orientation of the cover, the at least one elastic element configured to be compressed by moving the cover from the first orientation to the second orientation.

In examples, the at least one elastic element configured for being in a contracted orientation in the first orientation of the cover and in an expanded orientation in the second orientation of the cover, the at least one elastic element configured to be expanded by moving the cover from the first orientation to the second orientation.

In examples, the at least one elastic element includes a first spring and a second spring, a first end of the first spring being connected to the cover and a second end of the first spring being connected to the retainer, a first end of the second spring being connected to the cover and a second end of the second spring being connected to the retainer.

In examples, the retainer defines a slot in which the cover is slidable between the first orientation and the second orientation.

In examples, the retainer includes a first lip on a first side of the slot and a second lip on a second side of the slot, the first and second lips configured for retaining the cover in the slot as the cover is slid between the first orientation and the second orientation.

In examples, the retainer includes a first section defining the first side of the slot and including the first lip, a second section defining the second side of the slot and including the second lip, and a third section defining a longitudinal end of the slot, the cover being movable toward the third section when moving from the first orientation to the second orientation.

In examples, the retainer includes a semi-circular outer perimeter when viewed from a top of the cocktail shaker, the semi-circular outer perimeter extending along the first section, the second section and the third section of the retainer.

In examples, the base further includes an inclined wall extending upward from an edge of the opening and away from the top wall, the inclined wall being at an obtuse angle with respect to the top wall.

In examples, the cover is slidably connected to the top wall for sliding parallel to the top wall.

In examples, the cover includes a finger grip for moving the cover from the first orientation to the second orientation.

In examples, the cover includes a sealing gasket for sealing the opening and the pressure relief hole in the first orientation.

In examples, the cocktail shaker further includes a strainer positioned below the opening, the strainer being configured to strain out ice from the liquid ingredients upon pouring of the liquid ingredients through the strainer and out of the opening.

In examples, the base includes an annular section configured for connecting to the cup, the strainer including a plate-shaped base configured for connecting to the annular section of the base, the plate-shaped base including a plurality of holes or slots formed therein.

A method of using the cocktail shaker sequentially includes filling the cup with the liquid ingredients; connecting the lid on top of the cup; shaking the cocktail shaker to mix the liquid ingredients; applying a force to the cover with a finger of a user to move the cover from the first orientation to the second orientation; pouring at least some of the liquid ingredients out of the opening into a glass while the cover is in the second orientation; and releasing the force applied to the cover to cause the elastic element to move the cover from the second orientation back into the first orientation.

A cocktail shaker lid configured for being connected to a cup for receiving liquid ingredients to form a cocktail shaker is also provided. The lid includes a base including an opening for dispensing the liquid ingredients out of the cocktail shaker, and a pressure relief hole for releasing air from the cup while dispensing the liquid ingredients out of the cocktail shaker through the opening. The lid also includes a cover movably coupled to the base for moving between a first orientation in which the cover covers the opening and the pressure relief hole, and a second orientation in which the opening and the pressure relief hole are uncovered. The lid further includes at least one elastic element biasing the cover into the first orientation. The cover is movable from the first orientation into the second orientation by overcoming the biasing by the at least one elastic element.

A method is also provided for manufacturing a cocktail shaker lid configured for being connected to a cup for receiving liquid ingredients to form a cocktail shaker. The method includes creating a base defining an opening for dispensing the liquid ingredients out of the cocktail shaker and a pressure relief hole for releasing air from the cup while dispensing the liquid ingredients out of the cocktail shaker through the opening; and creating an elastically loaded cover configured for being movably connected to the base, the elastic element loaded cover being biased into a first orientation in which the elastically loaded cover covers the opening and the pressure relief hole, the elastically loaded cover being movable from the first orientation into a second orientation in which the opening and the pressure relief hole are uncovered by a user applying a force with a finger of the user finger to overcome the elastically loading.

BRIEF DESCRIPTION OF THE DRAWINGS

The present disclosure is described below by reference to the following drawings, in which:

FIG. 1b shows an exploded transparent view of a lid of the cocktails shaker in accordance with an embodiment of the present disclosure;

FIG. 1c shows an exploded solid view of the lid shown in FIG. 1b;

FIG. 1d shows an assembled view of the lid shown in FIG. 1c;

FIG. 3 shows a lid in accordance with another embodiment of the present disclosure;

FIG. 4 shows a lid in accordance with another embodiment of the present disclosure;

FIG. 5 shows a lid in accordance with another embodiment of the present disclosure;

FIG. 6 illustrates each of lids in FIGS. 3 to 5 in an assembled orientation.

DETAILED DESCRIPTION

Figure 1A:
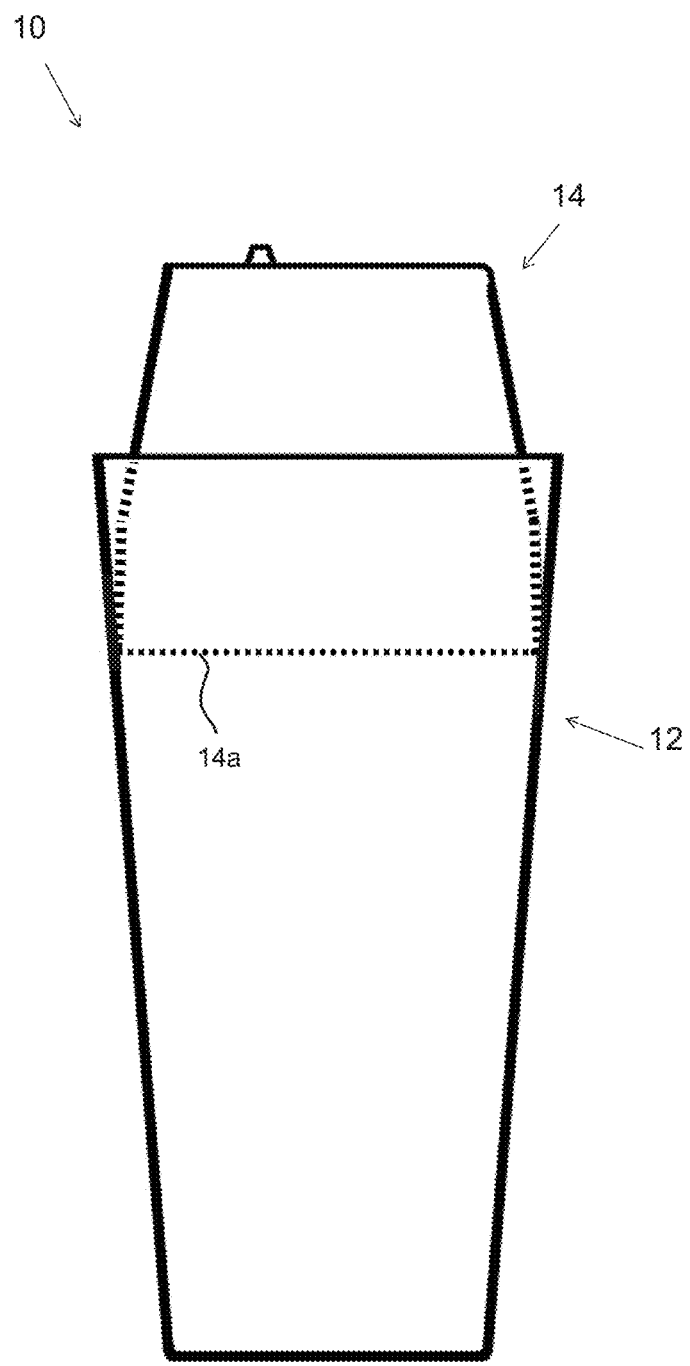
FIG. 1a shows a cocktail shaker in accordance with an embodiment of the present disclosure.

FIGS. 1a to 1e shows a cocktail shaker 10 including a cup 12 for receiving liquid ingredients, and a lid 14 for installing on the cup 12. The lid 14 includes a base 16 including an opening 18 for dispensing the liquid ingredients out of the cocktail shaker 10, and at least one pressure relief hole 20, 22 for releasing air from the cup 12 while dispensing the liquid ingredients out of the cocktail shaker 10 through the opening 18. The lid 14 also includes a cover 26 movably coupled to the base 16 for moving between a first orientation in which the cover 26 covers the opening 18 and the at least one pressure relief hole 20, 22, and a second orientation in which the opening 18 and the pressure relief holes 22 are partially or fully uncovered. The lid 14 further includes at least one elastic element in the form of at least one spring 30, 32 biasing the cover 26 into the first orientation. The cover 26 is movable from the first orientation into the second orientation by overcoming the biasing by the at least one spring 30, 32.

The base 16 includes for coupling to the cup 12, an annular intermediate section 34b that extends upward from annular while tapering radially inward, and an annular upper rim 34c on top of annular intermediate section 34b. As illustrated in FIG. 1a, the annular end section 34a defines a bottom end 14a of lid 14 that can contact an inner circumferential surface of cup 12 to couple lid 14 to cup 12. The base 16 further includes a top wall 38 including the opening 18 and the at least one pressure relief hole 20, 22. The top wall 38 is recessed below the annular upper rim. The cover 26 is slidably connected to the top wall 38. The base 16 further includes a retainer 40 configured for connecting the cover 26 to the top wall 38.

Figure 1F:
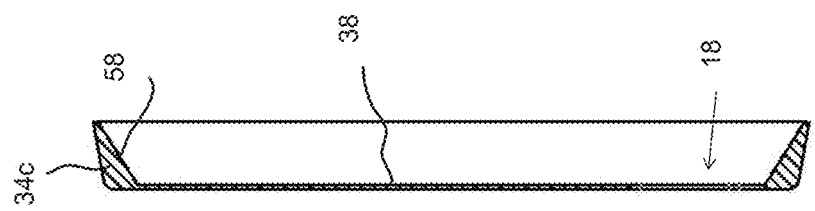
FIG. 1f schematically shows a cross-sectional view of the inclined wall shown in FIG. 1e.

A first portion of the at least one spring 30, 32, which in the embodiment shown in FIG. 1 is a first end 42 of the at least one spring 30, 32, is connected to the retainer 40 and a second portion of the at least one spring 30, 32, which in the embodiment shown in FIG. 1 is a second end 44 of the at least one spring 30, 32, is connected to the cover 26. In the embodiment shown in FIG. 1, the at least one spring 30, 32 is configured for being in an expanded orientation in the first orientation of the cover 26 and in a contracted orientation in the second orientation of the cover 26. The at least one spring 30, 32 is configured to be compressed by moving the cover 26 from the first orientation to the second orientation.

In the embodiment shown in FIGS. 1b, 1c, the cocktail shaker 10 includes a first spring 30 and a second spring 32. The first end 42 of the first spring 30 is connected to the cover 26 and the second end 44 of the first spring 30 is connected to the retainer 40. The first end 42 of the second spring 32 is connected to the cover 26 and the second end 44 of the second spring 32 is connected to the retainer 40. In other embodiments, instead of being springs, the elastic element can be one or more rubber bands.

The retainer 40 defines a slot 46 in which the cover 26 is slidable between the first orientation and the second orientation. The retainer 40 includes a first lip 48 on a first side of the slot 46 and a second lip 50 on a second side of the slot 46. The first lip 48 and second lip 50 are configured for retaining the cover 26 in the slot 46 as the cover 26 is slid between the first orientation and the second orientation.

The retainer 40 includes frame 52 and a cap 54 for being attached on top of the frame. The frame 52 includes a first section 52a defining the first side of the slot 46 and including the first lip 48, a second section 52b defining the second side of the slot 46 and including the second lip 50, and a third section 52c defining a longitudinal end of the slot 46. The cover 26 is movable toward the third section 52c when moving from the first orientation to the second orientation. The frame 52 includes a semi-circular outer perimeter when viewed from a top of the cocktail shaker 10. The semi-circular outer perimeter extends along the first section 52a, the second section 52b and the third section 52c of the frame 52. The frame 52 can be connected to top wall 38 by threaded fasteners 56 that are received in holes 38a in top wall 38. Holes 38a are surrounded by silicon o-rings 59, which are sandwiched between top wall 38 and frame 52, that prevent liquid from out of holes 38a. The cap 54 connects to the top of frame 52 and defines a top of the slot 46. In the second orientation, a portion of cover 26 closest to third section 52c can be positioned under cap 54.

Figure 1E:
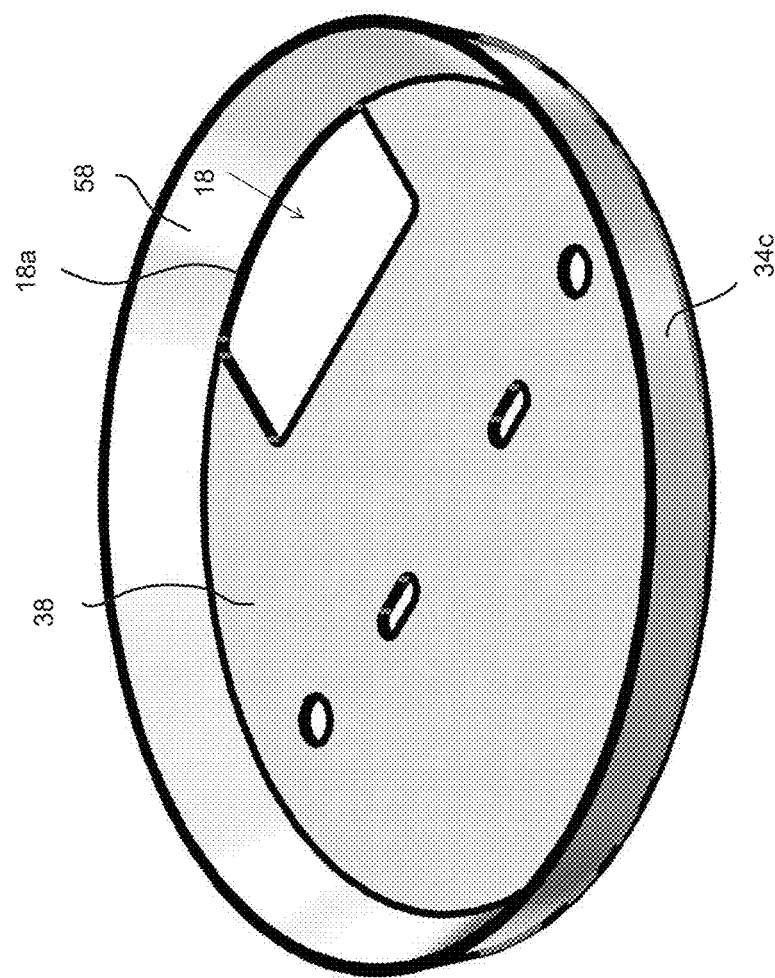
FIG. 1e schematically shows a perspective view of an inclined wall that joins the opening.

As shown schematically in FIG. 1e, If the base 16 can include an inclined wall 58 on an annular inner surface of annular upper rim 34c. The inclined wall 58 extends upward from an edge 18a of the opening 18 and away from the top wall 38 to annular upper rim 34c. The inclined wall 58 extends directly to opening 18 from upper rim 34c without any portion of top wall 38 between inclined wall 58 and opening 18 to prevent liquid residue from collecting between the inclined wall 58 and the opening 18 after pouring a cocktail. The inclined wall 58 is at an obtuse angle with respect to the top wall 38.

Referring back to FIGS. 1b to 1d, the cover 26 is slidably connected to the top wall 38 for sliding parallel to the top wall 38. The cover 26 includes a finger grip 60 for moving the cover 26 from the first orientation to the second orientation. The bartender can move the cover 26 away from the opening 18 into the second orientation by the bartender contacting a finger pull surface 62 of finger grip 60 with tips (i.e., distal phalanx) of the bartender's index, middle and/or ring finger and/or thumb, and pulling the cover 26 in opposition to the force of the springs 30, 32.

The cover 26 includes a finger pull surface 62, which includes the finger grip 60, and a sealing gasket 64 for sealing the opening 18 and the at least one pressure relief hole 20, 22 in the first orientation. The sealing gasket 64 is attached to the bottom of the finger pull surface 62 and defines a bottom surface of the cover 26. Gasket 64 includes a first portion 64a that covers the opening 18 in the first orientation of the cover 26 and a second portion 64b that covers the at least one pressure relief hole 20, 22 in the first orientation of the cover 26. Portions 64a, 64b are connected by an intermediate portion 64c that is narrower than the portions 64a, 64b. The intermediate portion 64c is configured to define gaps between first portion 64a and portions 64b. In particular, a first gap 64d is defined between first portion 64a and portions 64b on a first side of intermediate portion 64c, and a second gap 64e is defined between first portion 64a and portions 64b on a second side of intermediate portion 64c. When the cover 26 is in the second orientation, the first gap 64d is aligned with the first pressure relief hole 20 and the second gap 64e is aligned with the second pressure relief hole 22 to allow air to flow out of the cocktail shaker 10 and through the gaps 64d, 64e while liquid is being poured out of opening 18.

The cocktail shaker 10 further includes a strainer 66 positioned below the opening 18. The strainer 66 is configured to strain out ice and other solids from the liquid ingredients upon pouring of the liquid ingredients through the strainer 66 and out of the opening 18. The strainer 66 includes a plate-shaped base 66a configured for connecting to the annular section 34a of the base 16. The plate-shape base 66a includes a plurality of holes 66b and/or slots 66c formed therein. Springs 30, 32 allow the bartender to move cover 26 to fully or partially uncover opening 18, to allow the bartender to control the flow volume out of opening 18. For example, strainer 66 can be omitted or be removable, and the bartender can strain ice or solids during pouring by only applying a lessor force, in comparison with the force required to fully uncover the opening, to partially uncover the opening 18.

A method of using the cocktail shaker 10 includes filling the cup 12 with the liquid ingredients, connecting the lid 14 on top of the cup 12, shaking the cocktail shaker 10 to mix the liquid ingredients. After the liquid ingredients are sufficiently shaken, the user (i.e., bartender) can apply a force to the cover 26 with the user's finger to move the cover 26 from the first orientation to the second orientation. The user can then pour at least some of the liquid ingredients out of the opening 18 into a glass while the cover 26 is in the second orientation. After the cocktail(s) is poured, the user can release the force applied to the cover 26 to cause the elastic element 30, 32 to move the cover 26 from the second orientation back into the first orientation.

A method of manufacturing the cocktail shaker lid 14 can include creating the base 16 defining the opening 18 for dispensing the liquid ingredients out of the cocktail shaker 10, and a at least one pressure relief hole 20, 22 for releasing air from the cup 12 while dispensing the liquid ingredients out of the cocktail shaker 10 through the opening 18. The method also includes creating the elastically loaded cover 26 that is biased into a first orientation in which the elastically loaded cover 26 covers the opening 18 and the at least one pressure relief hole 20, 22. The elastically loaded cover 26 is movable from the first orientation into a second orientation in which the opening 18 and the pressure relief holes 22 are uncovered by bartender applying a force with the bartender's finger to overcome the elastically loading.

Figure 2B:
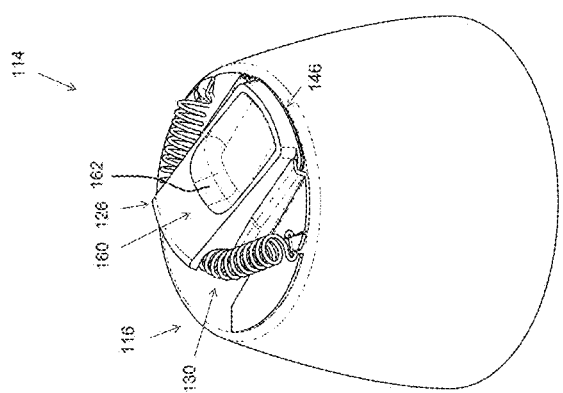
FIG. 2 shows a lid in accordance with another embodiment of the present disclosure.
Figure 2A:
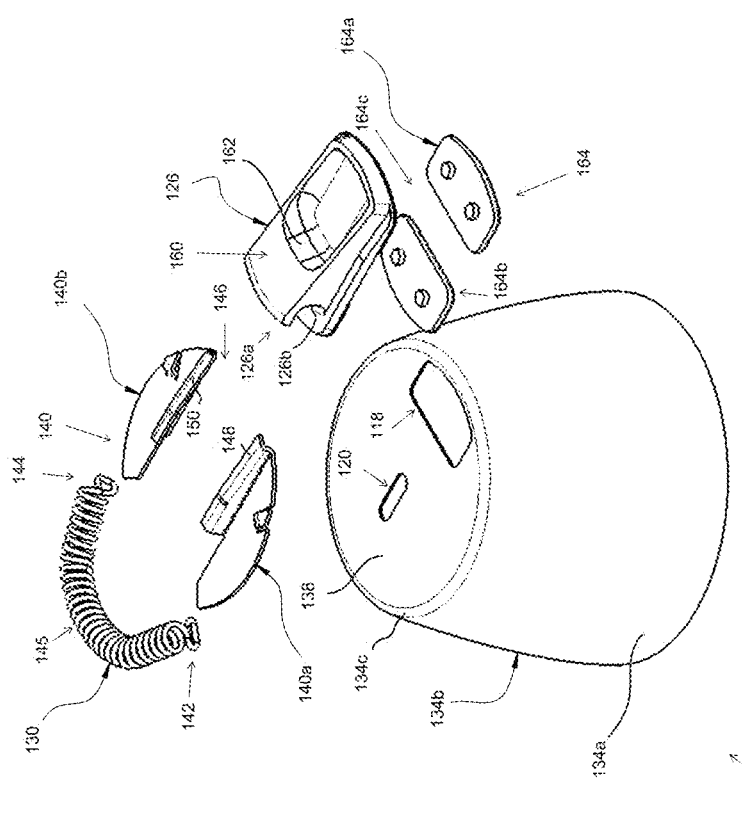

FIG. 2 shows a lid 114 in accordance with another embodiment of the present disclosure. Lid 114 includes a base 116 including an opening 118 for dispensing the liquid ingredients out of the cocktail shaker, and a pressure relief hole 120 for releasing air from the cup 12 while dispensing the liquid ingredients out of the cocktail shaker through the opening 118. The lid 114 also includes a cover 126 movably coupled to the base 116 for moving between a first orientation in which the cover 126 covers the opening 118 and the pressure relief hole 120, and a second orientation in which the opening 118 and the pressure relief hole 120 are uncovered. The lid 114 also includes a spring 130 biasing the cover 126 into the first orientation. The cover 126 is movable from the first orientation into the second orientation by overcoming the biasing by the spring 130.

The base 116 includes an annular low end section 134a for coupling to a top edge 12a of the cup 12, an annular intermediate section 134b that extends upward from annular while tapering radially inward, and an annular upper end 134c on top of annular intermediate section 134b. The base 116 further includes a top wall 138 including the opening 118 and the pressure relief hole 120. The cover 126 is slidably connected to the top wall 138. The base 116 further includes a retainer 140 configured for connecting the cover 126 to the top wall 138. The retainer 140 includes a first section 140a that is fixed to top wall 138 for example by adhesive, welding or one or more fasteners and a second section 140b spaced away from first section 140a and that is fixed to top wall 138 for example by adhesive, welding or one or more fasteners.

At least one first portion of the spring 130, which in the embodiment shown in FIG. 1 is both a first end 142 and a second end 144 of the spring 130, is connected to the retainer 140 and a second portion of the spring 130, which in the embodiment shown in FIG. 2 is a middle portion 145 of the spring 130, is connected to the cover 126. More specifically, the first end 142 of spring 130 is fixed to the first section 140a of retainer 140 and the second end 144 is fixed to the second section 140b of retainer 140. The middle portion 145 of spring 130 abuts a longitudinal end 126a of the cover 126 in a recess 126b of cover 126 to prevent spring 130 from moving upward and out of contact with 126.

In the embodiment shown in FIG. 2, the spring 130 is configured for being in a contracted orientation in the first orientation of the cover 26 and in an expanded orientation in the second orientation of the cover 26. The spring 130 is configured to be expanded by moving the cover 126 from the first orientation to the second orientation.

The retainer 140 defines a slot 146 between first section 140a and second section 140b in which the cover 126 is slidable between the first orientation and the second orientation. The retainer 140 includes a first lip 148 on a first side of the slot 146 and a second lip 150 on a second side of the slot 146. The first lip 148 and second lip 150 are configured for retaining the cover 126 in the slot 146 as the cover 126 is slid between the first orientation and the second orientation. The first section 140a includes the first lip 148 and the second section 140b includes the second lip 150.

The cover 126 is slidably connected to the top wall 138 for sliding parallel to the top wall 138. The cover 126 includes a finger grip 160 for moving the cover 126 from the first orientation to the second orientation. The bartender can move the cover 126 away from the opening 118 by the bartender contacting a finger pull surface 162 of finger grip 160 with tips (i.e., distal phalanx) of the bartender's index, middle and/or ring finger and/or thumb, and pulling the cover 126 in opposition to the force of the spring 130.

The cover 126 includes a finger grip 160, which includes the finger pull surface 162, and a sealing gasket 164 for sealing the opening 118 and the pressure relief hole 120 in the first orientation. The sealing gasket 164 is attached to the bottom of the finger pull surface 162 and defines a bottom surface of the cover 126. Gasket 164 includes a first portion 164a that covers the opening 118 in the first orientation of the cover 126 and a second portion 164b that covers the pressure relief hole 120 in the first orientation of the cover 126. Portions 164a, 164b are spaced from each other by a gap 164c. When the cover 126 is in the second orientation, the gap 164c is aligned with the pressure relief hole 120 a to allow air to flow out of the cocktail shaker and through the gap 164c while liquid is being poured out of opening 118. Except as described above, lid 114 is configured in the same manner as 14 and is operated and manufactured in the same manner as lid 14.

FIG. 3 shows a lid 214 in accordance with another embodiment of the present disclosure. Lid 214 is configured in the same manner as lid 14, except lid 214 includes annular upper rim 234c as part of a frame 252 of a retainer 240 instead of being formed integrally with an annular intermediate section 234b. Frame 252 and retainer 240 thus include a circular outer perimeter. Another difference is that springs 230, 232 are configured differently.

With respect to springs 230, 232, a first portion of the at least one spring 230, 232, which in the embodiment shown in FIG. 3 is a first end 242 of the at least one spring 230, 32, is connected to the retainer 240 and a second portion of the at least one spring 230, 232, which in the embodiment shown in FIG. 3 is a second end 244 of the at least one spring 230, 232, is connected to the cover 226. In the embodiment shown in FIG. 3, the at least one spring 230, 232 is configured for being in a contracted orientation in the first orientation of the cover 226 and in an expanded orientation in the second orientation of the cover 226. The at least one spring 230, 232 is configured to be expanded by moving the cover 226 from the first orientation to the second orientation. More specifically, the cover 226 includes two arms 226a, 226b protruding laterally from the cover 226, and the second end 244 of each of springs 230, 232 is connected to the respective arm 226a, 226b. The first end 242 of each of springs 230, 232 is connected to annular upper rim 234c. Except as described above, lid 214 is configured in the same manner as 14 and is operated and manufactured in the same manner as lid 14.

FIG. 4 shows a lid 314 in accordance with another embodiment of the present disclosure. Lid 314 is configured in the same manner as lid 214, except springs 330, 332 are configured for being in an expanded orientation in the first orientation of the cover 326 and in a contracted orientation in the second orientation of the cover 326.

FIG. 5 shows a lid 414 in accordance with another embodiment of the present disclosure. Lid 414 is configured in the same manner as lid 314, except springs 430, 432 are attached to a longitudinal end of the cover 426, in the same manner as in FIG. 1.

FIG. 6 illustrates each of lids 214, 314, 414 in an assembled orientation.

Figure 7B:
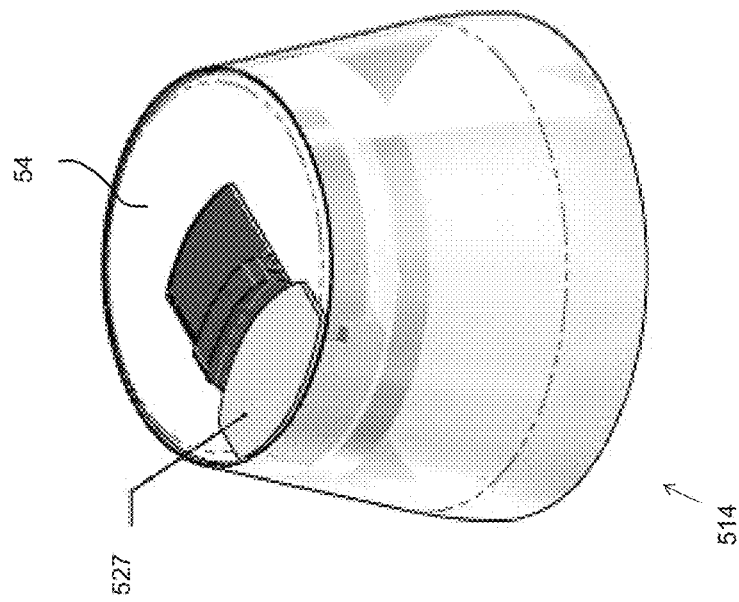
FIGS. 7a, 7b show a lid in accordance with another embodiment of the present disclosure.
Figure 7A:
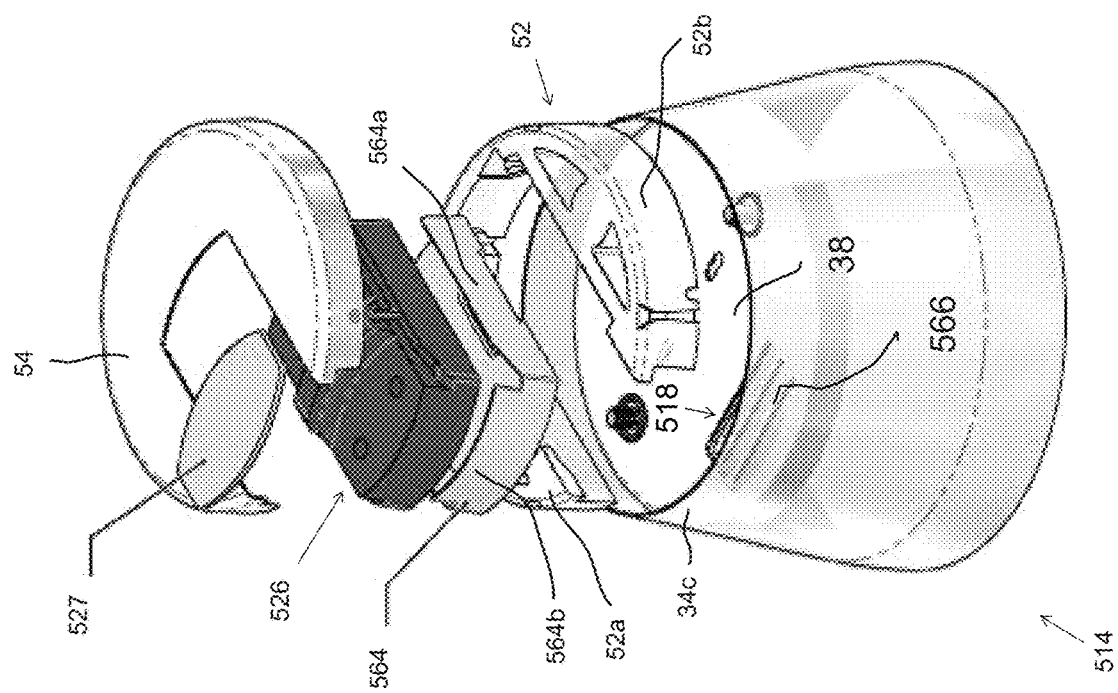

FIGS. 7a, 7b show a lid 514 in accordance with another embodiment of the present disclosure. Lid 514 is configured in the same manner as lid 14, except cover 526 includes a sealing gasket 564 and an opening 518 includes a strainer 566 formed contiguous with the top wall 38. Gasket 564 includes, in addition to the above-described features of gasket 64, side flaps 564a, and a front flap 564b. Side flaps 564a contact the respective first section 52a and second sections 52b of frame 52 to prevent liquid from flowing out of opening 18 and in between flaps 526a and the respective first section 52a and second sections 52b of frame 52. Cover 526 further includes a top gasket 527 fixed to the top of cover 526 and configured for contacting the top surface of cap 54 and the inner annular surface of annular upper rim 34c prevent liquid from flowing out of opening 18 and in between flap 564b and annular upper rim 34c.

In the preceding specification, the present disclosure has been described with reference to specific exemplary embodiments and examples thereof. It will, however, be evident that various modifications and changes may be made thereto without departing from the broader spirit and scope of present disclosure as set forth in the claims that follow. The specification and drawings are accordingly to be regarded in an illustrative manner rather than a restrictive sense.

LIST OF REFERENCE CHARACTERS 10 cocktail shaker
12 cup
12a top edge
14 lid
16 base
18 opening
18a edge
20 pressure relief hole
22 pressure relief hole
26 cover
30 spring
32 spring
34 annular section
34a annular end section
34b annular intermediate section
34c annular upper rim
38 top wall
38a holes
40 retainer
42 first end
44 second end
46 slot
48 first lip
50 second lip
52 frame
52a first section
52b second section
52c third section
54 cap
56 threaded fasteners
58 inclined wall
59 silicon o-rings
60 finger grip
62 finger pull surface
64 sealing gasket
64a first portion
64b second portion
64c intermediate portion 64d first gap
64e second gap
66 strainer
66a plate-shaped base
66b plurality of holes
66c slots
114 lid
116 base
118 opening
120 pressure relief hole
126 cover
126a longitudinal end
126b recess
130 spring
134a annular end section
134b annular intermediate section
134c annular upper rim
138 top wall
140 retainer
140a first section
140b second section
142 first end
144 second end
145 middle portion
146 slot
148 first lip
150 second lip
160 finger grip
162 finger pull surface
164 sealing gasket
164a first portion
164b second portion
164c gap64
214 lid
226 cover
226a two arms
226b two arms
230 at least one spring
232 at least one spring
234b annular intermediate section
240 retainer
242 first end
244 second end
254c annular upper rim
314 lid
326 cover
330 springs
332 springs
414 lid
426 cover
430 springs
432 springs
510 second lip
514 lid
526 cover
526a side flaps
526b front flap
527 top gasket
564 sealing gasket

What is claimed is:

1. A cocktail shaker comprising:
a cup for receiving liquid ingredients;
a lid for installing on the cup, the lid including:
a base including:
an opening for dispensing the liquid ingredients out of the cocktail shaker; and
a pressure relief hole for releasing air from the cup while dispensing the liquid ingredients out of the cocktail shaker through the opening;
a cover movably coupled to the base for moving between a first orientation in which the cover covers the opening and the pressure relief hole, and a second orientation in which the opening and the pressure relief hole are uncovered; and
at least one elastic element biasing the cover into the first orientation, the cover being movable from the first orientation into the second orientation by overcoming the biasing by the at least one elastic element,
the cover comprising a first gasket portion for covering the opening in the first orientation and a second gasket portion for covering the pressure relief hole in the first orientation,
the first gasket portion and the second gasket portion defining a gap therebetween,
the cover being configured so that the movement of the cover into the second orientation by overcoming the biasing by the at least one elastic element allows the pressure relief hole to be uncovered, allowing air to flow out of the pressure relief hole and through the gap upon pouring of the liquid ingredients out of the opening.

2. The cocktail shaker as recited in claim 1, wherein the base includes:
an annular section for coupling to a top edge of the cup; and
a top wall including the opening and the pressure relief hole, the cover being slidably connected to the top wall.

3. The cocktail shaker as recited in claim 2, wherein the base further includes a retainer configured for connecting the cover to the top wall.

4. The cocktail shaker as recited in claim 3, wherein a first portion of the at least one elastic element is connected to the retainer and a second portion of the at least one elastic element is connected to the cover.

5. The cocktail shaker as recited in claim 4, wherein the at least one elastic element configured for being in an expanded orientation in the first orientation of the cover and in a contracted orientation in the second orientation of the cover, the at least one elastic element configured to be compressed by moving the cover from the first orientation to the second orientation.

6. The cocktail shaker as recited in claim 4, wherein the at least one elastic element configured for being in a contracted orientation in the first orientation of the cover and in an expanded orientation in the second orientation of the cover, the at least one elastic element configured to be expanded by moving the cover from the first orientation to the second orientation.

7. The cocktail shaker as recited in claim 3, wherein the at least one elastic element includes a first spring and a second spring,
a first end of the first spring being connected to the cover and a second end of the first spring being connected to the retainer,
a first end of the second spring being connected to the cover and a second end of the second spring being connected to the retainer.

8. The cocktail shaker as recited in claim 3, wherein the retainer defines a slot in which the cover is slidable between the first orientation and the second orientation.

9. The cocktail shaker as recited in claim 8, wherein the retainer includes a first lip on a first side of the slot and a second lip on a second side of the slot, the first and second lips configured for retaining the cover in the slot as the cover is slid between the first orientation and the second orientation.

10. The cocktail shaker as recited in claim 9 wherein the retainer includes a first section defining the first side of the slot and including the first lip, a second section defining the second side of the slot and including the second lip, and a third section defining a longitudinal end of the slot, the cover being movable toward the third section when moving from the first orientation to the second orientation.

11. The cocktail shaker as recited in claim 10, wherein the retainer includes a semi-circular outer perimeter when viewed from a top of the cocktail shaker, the semi-circular outer perimeter extending along the first section, the second section and the third section of the retainer.

12. The cocktail shaker as recited in claim 2, wherein the base further includes an inclined wall extending upward from an edge of the opening and away from the top wall, the inclined wall being at an obtuse angle with respect to the top wall.

13. The cocktail shaker as recited in claim 2, wherein the cover is slidably connected to the top wall for sliding parallel to the top wall.

14. The cocktail shaker as recited in claim 1, wherein the cover includes a finger grip for moving the cover from the first orientation to the second orientation.

15. The cocktail shaker as recited in claim 1, wherein the cover includes a sealing gasket for sealing the opening and the pressure relief hole in the first orientation.

16. The cocktail shaker as recited in claim 1, further comprising a strainer positioned below the opening, the strainer being configured to strain out ice from the liquid ingredients upon pouring of the liquid ingredients through the strainer and out of the opening.

17. The cocktail shaker as recited in claim 16, wherein the base includes an annular section configured for connecting to the cup, the strainer including a plate-shaped base configured for connecting to the annular section of the base, the plate-shaped base including a plurality of holes or slots formed therein.

18. A method of using the cocktail shaker as recited in claim 1, the method sequentially comprising:
   filling the cup with the liquid ingredients;
   connecting the lid on top of the cup;
   shaking the cocktail shaker to mix the liquid ingredients;
   applying a force to the cover with a finger of a user to move the cover from the first orientation to the second orientation;
   pouring at least some of the liquid ingredients out of the opening into a glass while the cover is in the second orientation; and
   releasing the force applied to the cover to cause the elastic element to move the cover from the second orientation back into the first orientation.

19. The cocktail shaker as recited in claim 1 wherein the elastic element is positioned above the base,
   the first gasket portion and the second gasket portion being on top of the base.

20. A cocktail shaker comprising:
   a cup;
   a lid for installing on the cup, the lid including:
   a base having a first end configured to be retained within the cup and having an intermediate section, said base including:
      a dispensing opening;
      a strainer;
      a pressure relief hole;
      a sliding cover configured to selectively cover and uncover both the dispensing opening and the pressure relief hole; and
      at least one elastic element configured to bias the sliding cover into a closed position covering the dispensing opening and pressure relief hole; and
   wherein
   the intermediate section has a height which, when installed, extends above the cup and allows for one-handed operation of the sliding cover while holding the cocktail shaker.

* * * * *